Jan. 16, 1934.   T. A. MITCHELL   1,943,333
METHOD OF CHLORIDIZING METALLURGICAL ORES
Original Filed Dec. 30, 1930
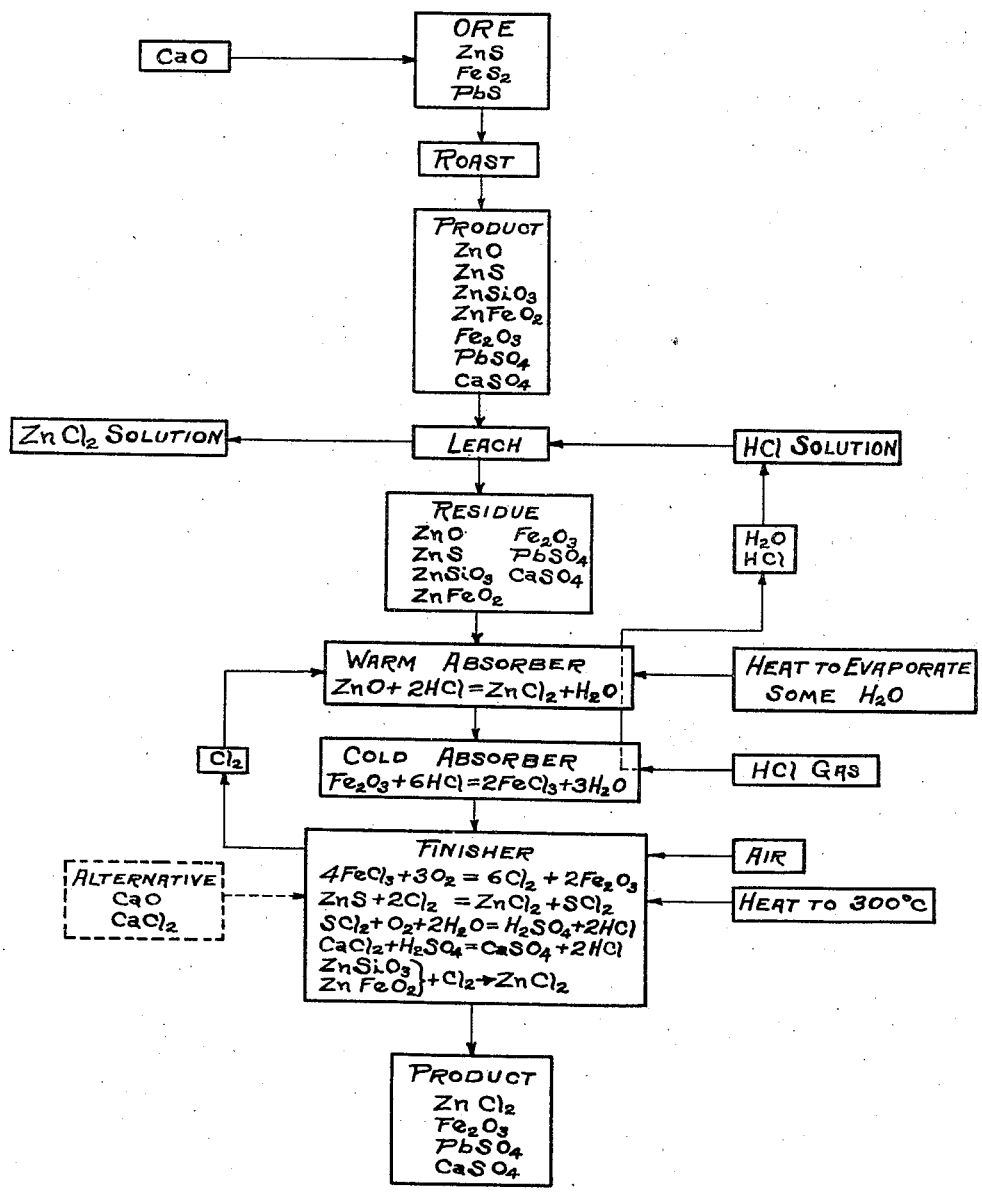
Inventor
THOMAS A. MITCHELL
By Clayton R. Jenkes
Attorney Patented Jan. 16, 1934

1,943,333

UNITED STATES PATENT OFFICE 1,943,333

METHOD OF CHLORIDIZING METALLURGICAL ORES

Thomas A. Mitchell, Denver, Colo., assignor to Lafayette M. Hughes, Denver, Colo.

Application December 30, 1930, Serial No. 505,580
Renewed January 30, 1933

19 Claims. (Cl. 75—67)

My invention relates to a method of chloridizing metallurgical ores and particularly those ore materials containing a high content of an ore metal oxide, carbonate, sulfide or sulfate, such as is obtained when a zinc bearing ore is concentrated by standard methods.

I have heretofore developed a method of chloridizing various metallurgical ores, such as one containing a zinc compound, by a process which involves first so treating the ore as to obtain an ore metal oxide and then chloridizing the oxide by means of hydrochloric acid gas, as set forth and claimed in my copending application Serial No. 687,827 filed September 1, 1933. The reaction of zinc and other metal oxides and hydrochloric acid gas results in the formation of one or more molecules of water for each molecule of metal chloride produced. I have found that if a high zinc concentrate containing, for example, 60% of zinc sulfide is being treated to form a chloride, then this large amount of zinc chloride, which is very soluble in water, goes into solution in the water evolved to such an extent as to form a viscous, gummy mass and cause the ore particles to stick together and form balls which will not readily and economically absorb the hydrochloric acid gas or other chloridizing reagent employed. The greater the amount of zinc chloride formed, the more sirupy and viscous will the batch become, so that this particular method of chloridizing a zinc oxide roast efficiently has heretofore been limited to the treatment of materials which do not contain a high percentage of zinc oxide.

It is therefore the primary object of this invention to provide a method of chloridizing ore materials having a high content of a metal compound which tends to hinder the penetration of the mass by the chloridizing agent, and particularly a method which will be efficient and economical and give a high yield of desired ore values.

A further object is to provide a complete process for the extraction of zinc from a metallurgical ore having a high zinc content which will result in the chloridization of substantially all of the zinc of the ore and the recovery thereof.

With these and other objects in view, as will be apparent to one skilled in the art, my invention resides in the combination of steps set forth in the specification and covered by the claims appended hereto.

In accordance with my invention, I propose to treat various ore materials, such as a zinc bearing ore or concentrate, in such a manner as to convert the major portion of an ore metal content to an oxide, as by a roasting operation, and then remove a large proportion of this metal oxide by leaching the ore with a suitable solvent therefor, such as hydrochloric or sulfuric acid, so that only a low concentration of the metal compounds will need to be treated in the later stages. Thereafter, the residue is chloridized, and my process is one which I find highly efficient for extracting a small amount of ore metal compound as a chloride. For this purpose, I preferably subject the leached ore to the action of hydrochloric acid in a suitable reaction chamber, and finally, if the ore material contains difficultly chloridized zinc compounds, such as zinc sulfide or ferrite, I treat it with chlorine gas, and preferably by means of nascent chlorine or by reaction with a metal chloride capable of providing chlorine or chloridion. Ferric chloride is particularly suited for this purpose if heated in an oxidizing atmosphere in the presence of the ore material to a temperature at which chlorine is produced. If iron is present in the ore, the iron oxide formed in the roasting operation may be chloridized by means of hydrochloric acid or other suitable reagent so as to form the ferric chloride for the production of the nascent chlorine.

If the ore being treated is a sulfide, such as zinc sulfide, the chloridizing step and preferably the initial roasting operation are carried on in the presence of a material capable of fixing the sulfur trioxide or the free sulfate radical present by reacting therewith to form an insoluble sulfate, as claimed broadly in my copending application Serial No. 597,627 filed March 8, 1932. This may be accomplished by mixing with the pulverized ore material a sufficient amount of a finely divided alkaline earth metal compound, such as the oxides of calcium, strontium or barium, capable of preferentially reacting with any available sulfur trioxide or sulfate radical and preventing the zinc from combining therewith. If, for example, calcium oxide, carbonate or hydroxide is present during the initial roasting operation, the sulfur trioxide formed by oxidation of the ore sulfide reacts preferentially with the calcium to form calcium sulfate and does not form zinc sulfate while the calcium reagent is present in excess. The formation of calcium sulfate and its interspersion throughout the roast results in the ore being open and porous and therefore easily permeated by the chloridizing gases, and this is apparently due to the growth of crystals of calcium sulfate which separate the ore particles and expose them to the action of subsequent reagents. Also, if the ore and its treatment are such that sulfur chloride or sulfur trioxide, for example, should be formed during the chloridizing reaction, the presence of lime or calcium chloride will insure that the zinc goes to the chloride form, while calcium takes up any sulfur trioxide that may be formed, as by the oxidation of the sulfur chloride.

In order that the invention may be more fully understood, reference is had to the diagrammatic drawing illustrating the application of this process to a given ore. As there indicated, I may treat an ore concentrate containing zinc, lead and iron sulfides by the following steps. In order to prevent the formation of zinc sulfate during the roasting operation and to provide a roasted material which is easily permeated by the subsequent leaching and chloridizing reagents, I add an alkaline earth metal oxygen compound, such as lime, in quantity sufficient to fix any free sulfur trioxide which would otherwise attack the zinc and form a sulfate. This quantity is determined by analyzing the ore roast for the soluble sulfate content, and then adding a quantity in excess of that determined by the analysis. For an ore containing 45% of zinc, 5% of lead and 10% of iron I preferably insure the formation of 5 to 10% of calcium sulfate in the roast, and so carry on the roasting operation as to minimize the tendency for zinc sulfate to form. Any excess of lime not used during this operation will be converted to a chloride and easily removed at a later stage. It will be understood that it may be advisable to limit the amount of lime employed to avoid having any large excess to consume chloridion.

The ore and the lime may be ground together with water in a ball mill, after which this wet mixture is dried and roasted in accordance with standard practice at a temperature and under suitable conditions to form a large proportion of zinc oxide. No attempt is made to convert all of the zinc sulfide to the oxide form, and there may ordinarily be 1 or 2% or more of zinc left as a sulfide.

The roast is then transferred to a suitable apparatus where it is leached with an aqueous solution of sulfuric acid, or preferably hydrochloric acid, which is used in quantity and concentration sufficient to reduce the zinc content to 10 or 15%, leaving the remainder as zinc oxide and zinc sulfide. Since a large part of the zinc is thus dissolved out of the original calcine, the tonnage of the ore residue passing through the later stage of the chloridizing treatment is thereby materially reduced, thus providing an efficient and economical procedure.

If iron is present in the ore, it is desirable that the iron be kept from going into solution in the leaching bath in order that the zinc salt may be easily recovered. To this end, I treat the roasted material with insufficient acid to dissolve all of the zinc content but to take out, say, 80% of the zinc oxide and leave the rest for the subsequent chloridizing treatment. By having zinc oxide present in excess I insure that the acid will be used up by the zinc oxide and will not attack the iron oxide. This will be readily apparent from the fact that zinc oxide will precipitate ferric hydroxide from a ferric chloride solution and form zinc chloride. Since the subsequent treatment is chloridization, I prefer to use hydrochloric acid for the leaching solution, and thus avoid contaminating the ore residue with more sulfate. If, however, sulfuric acid is used as the leaching agent, then any zinc sulfate or acid which goes with the residue to the subsequent chloridizing operation will be taken care of by the excess of lime or calcium chloride which is present for fixing the sulfur as an insoluble calcium sulfate.

It, furthermore, is not necessary to take out all of the zinc oxide in this treatment, since it may be easily recovered in the later steps of the process which are particularly serviceable for treating ores having a low concentration of zinc and are not rendered inefficient by the prior removal of the major portion of the zinc oxide. Ordinarily there is present a considerable amount of silica and other materials, such as iron oxide and lead sulfate, depending of course upon the nature of the ore being treated, which can take up some zinc chloride as a coating on their surfaces, hence they aid in preventing the mass from balling up into large lumps which cannot be easily treated. It is intended, however, that sufficient zinc be removed from the ore batch to insure that the residue will not become sticky and viscous owing to the presence of water vapor formed during the chloridizing treatment.

Having thus treated the ore in the initial stage, we will now consider the treatment in the final stages of the chloridizing process. The residue has been, by this time, corrected, as it were, for its sulfide and sulfate content (disregarding the lead sulfate which goes through these stages unchanged) by the addition of lime or other alkaline earth metal compound which is capable of fixing the free sulfate radical and forming an insoluble sulfate therewith. As explained above, this may be accomplished by adding the lime initially or at any stage after roasting up to the time of introduction of the ore residue to the finisher where nascent chlorine is evolved for the final chloridizing step.

The chloridizing operation after the leaching step, which is described and claimed broadly in my copending application Serial No. 687,827 filed September 1, 1933, consists primarily of two main stages, where the residue contains iron, as in the example given. The first stage preferably comprises treating the batch with hydrochloric acid, and this results first in the conversion of the remaining zinc oxide to a chloride. When this has been effected a sufficient amount of the iron oxide will be likewise chloridized to form enough ferric chloride for the final chloridizing step. This final stage in the chloridizing operation consists in heating the mixture containing the ferric chloride in an oxidizing atmosphere to a temperature at which ferric chloride is not stable and thus forming nascent chlorine which will attack the difficulty chloridized portions of the ore, such as the remaining zinc sulfide as well as zinc ferrite and various other compounds formed during the roasting operation.

If preferred, I may utilize an aqueous solution of hydrochloric acid for the purpose of forming the ferric chloride. In that case, after sufficient zinc or other soluble chlorides have been first formed and removed, by the leaching operation above described, the residue may then be treated with hydrochloric acid solution of suitable strength to convert the ferric oxide to ferric chloride, which will take place after the zinc oxide in the residue has been chloridized. This may be done with a small amount of a strong acid solution and the soluble ferric chloride may be left in the ore residue for introduction to the finisher.

If this operation is carried out by the dry treatment, the chloridizing of the iron oxide may be effected by means of hydrochloric acid gas passing as a counter current over the ore residue which is agitated and caused to travel through two absorbers arranged in series, as illustrated in the drawing. To this end, cold hydrochloric acid gas is introduced into the second absorber and there changes some of the ferric oxide to ferric chloride. The excess of hydrochloric acid gas passes into the first absorber and there converts the remaining zinc oxide to zinc chloride with the evolution of water. This first absorber is preferably heated to some extent, but below the dissociation temperature of ferric chloride, so as to drive off a part of this water. This may be accomplished by heating the material to a temperature of 80° C. or so, which is ordinarily found sufficient for carrying off enough of the moisture to prevent the ore mass from balling up in the subsequent stages. This excess of water and hydrochloric acid gas may, if desired, be conducted into the hydrochloric acid solution used in the leaching apparatus and thus be recovered. The purpose of evaporating water from the first absorber involves the same object as that of the leaching operation, namely to prevent zinc chloride from balling up the ore material as a viscous, sticky mass during the subsequent finishing operation. The treatment with hydrochloric acid gas in the second absorber is carried on under such conditions as to produce ferric chloride efficiently, and this is preferably accomplished by utilizing a strong atmosphere of hydrochloric acid gas, and carrying on the reaction at a low temperature in the presence of moisture.

It will be appreciated that various types of apparatus may be utilized for these absorbers as well as for the finisher, but it may be stated that rotary tubes are satisfactory for the purpose, these tubes being provided with agitating baffles and inclined towards the exit end, so that when revolved the material is lifted and showered through the gas which is passing in a counter flow relative thereto. The finisher for the final stage is preferably a long tube which is heated at its lower exit end to a temperature at which ferric chloride is not stable and preferably to a temperature of 250° to 300° C. This may be accomplished by jacketing the finisher tube and passing hot air therethrough. Oxygen or air is introduced into the lower end of the finisher to aid in the formation of chlorine and ferric oxide.

The material which leaves the second absorber consists largely of zinc and iron chlorides, iron oxide, and lead and calcium sulfates, together with such unconverted ore metal values as zinc sulfide and zinc ferrite as well as the ore gangue. This material will be provided with sufficient lime or calcium chloride or other suitable sulfate fixer, which may be added at this time if it was not added prior to roasting, so that any free sulfate radical or sulfur trioxide developed during the finishing operation will be taken up thereby. Incidentally, if lime was added to the raw ore, the gypsum formed during or before roasting is not dissolved by the hydrochloric acid treatment but remains with the residue. The amount of lime to be added at this point, if any, may be determined by analysis of the material to be treated and added in such an amount that no large excess of calcium chloride is left in the final product. The ore batch contains some moisture, and the ferric chloride which may have crystallized as $FeCl_3.6H_2O$ will dissolve to some extent in its water of crystallization or in some of the moistures present and so flow into intimate contact with the ore particles. Thus as the material passes lengthwise through the long finisher tube and is gradually heated by the introduction of heat at the other end of the tube, the ferric chloride will gradually decompose in the presence of oxygen and form iron oxide and nascent chlorine. This nascent chlorine will attack the zinc sulfide hearts and zinc ferrite, ferrate and silicate as well as other chloridizable compounds that may be present, and chloridize them. Any sulfur chloride which is formed by this reaction will be oxidized to sulfur trioxide in the presence of ferric oxide serving as a catalyzer, and form hydrochloric acid and sulfuric acid, the hydrochloric acid acting in the chloridizing operation and the sulfuric acid being taken up by the lime or calcium chloride.

The product issuing from the finisher will consist of the rock gangue containing zinc chloride, lead and calcium sulfates, ferric oxide and calcium chloride, if in excess. By leaching this material in water or other suitable solvent the zinc may be readily recovered and separated from the iron oxide and the calcium sulfate. Any calcium chloride which may have been formed in the reaction may be permitted to go into solution with the zinc chloride and be separated therefrom by the introduction of calcium carbonate to precipitate zinc carbonate. The calcium chloride in solution may be recovered for various uses and if desired it may be introduced into the previous stages of the process in the place of lime and utilized for the fixation of the sulfate radical which may be present or formed during the process. Calcium chloride may be removed from the solution by adding the correct amount of sulfuric acid to form calcium sulfate as a precipitate. By adding zinc oxide, any hydrochloric acid formed will be converted to zinc chloride.

It will be understood that this invention applies to other metals besides zinc, which has been used above by way of illustration, and in particular where it is found desirable to remove a portion of the ore metal values after the roasting and prior to the chloridizing operations. Hence the claims are to be interpreted accordingly.

Having thus described my invention, what I claim as new and desire to secure by Letters Patent is:

1. The method of treating a metallurgical ore material containing zinc oxide comprising the steps of leaching a considerable proportion of said oxide from said material and subsequently treating the residue with a gaseous chloridizing reagent to convert zinc compound therein to a chloride.

2. The methods of treating a metallurgical ore material containing a high percentage of a zinc oxygen compound comprising the steps of leaching the material with a solvent capable of removing a large proportion of zinc compound, and subsequently treating the residue with hydrochloric acid gas to convert the remainder of the zinc compound to a chloride.

3. The method of treating a metallurgical ore containing an iron compound and a high percentage of a zinc compound comprising the steps of leaching a considerable proportion of the zinc compound from the ore material without dissolving a material amount of the iron, and thereafter chloridizing the mass with a gaseous reagent containing chloridion to form zinc chloride.

4. The method of treating a metallurgical ore containing zinc sulfide comprising the steps of roasting the ore to form zinc oxide and leave only a small residuum of zinc sulfide, then leaching a considerable portion of the zinc oxide from the roasted material and subsequently chloridizing the remainder of the zinc compound.

5. The method of treating an ore material containing the oxides of iron and another metal comprising the steps of leaching the material with hydrochloric acid solution while preventing the formation of iron chloride, treating the residue with hydrochloric acid to form iron chloride and subsequently heating the mixture of iron chloride and ore residue in the presence of oxygen to a temperature at which chlorine is formed from said chloride and serves to chloridize difficultly treated portions of the ore.

6. The method of chloridizing a metallurgical ore containing a high content of a metal compound comprising the steps of roasting the ore in finely divided condition in the presence of an alkaline earth compound and a sulfur bearing material capable of forming alkaline earth metal sulfate interspersed throughout the roast and of producing an open and porous material, thereafter dissolving a considerable proportion of a compound of said metal from the ore, and subsequently chloridizing the residue and recovering further metal values therefrom.

7. The method of treating an ore containing a high percentage of zinc and iron sulfides comprising the steps of roasting the ore in the presence of sufficient alkaline earth metal compound which is capable of reacting with available sulfur trioxide to prevent the zinc from going to a sulfate, then leaching a considerable proportion of the zinc oxide from the mass with a solvent insufficient in amount to dissolve all of the zinc compound and thereby leaving some zinc oxide and iron oxide in the residue, and subsequently treating the residue with hydrochloric acid gas to form zinc chloride therefrom.

8. The method of treating a metallurgical ore containing a zinc sulfide and iron sulfide comprising the steps of roasting the ore to form oxides of said metals, then leaching the roasted material with an acid to remove a portion of the zinc oxide therefrom, treating the residue with a chloridizing agent to form ferric chloride and subsequently heating the mixture in the presence of oxygen to a temperature at which the ferric chloride will produce nascent chlorine for chloridizing further portions of the ore.

9. The method of treating an ore containing zinc and iron sulfides comprising the steps of roasting the material in the presence of an alkaline earth metal compound capable of fixing any available sulfur trioxide, leaching the mass with hydrochloric acid solution in amount insufficient to dissolve all of the zinc oxide in the ore and leaving iron oxide in the residue, thereafter converting said iron oxide to ferric chloride and then heating the mixture containing the same under oxidizing conditions and to a temperature at which chlorine is evolved for chloridizing a further portion of the ore.

10. The process of chloridizing an ore material containing a high content of zinc oxide comprising the steps of reducing the amount of zinc oxide in said material and thereafter treating the residue in a substantially dry condition with hydrochloric acid gas to form zinc chloride, said reduction in zinc content being such that, with reference to the capability of the residue to absorb the water of reaction, the amount of zinc chloride and water formed will be insufficient to produce a syrupy condition and materially hinder the penetration of the reagent gas into the ore material.

11. The process of chloridizing an ore containing a high content of zinc sulfide comprising the steps of roasting the ore and thereafter chloridizing the roasted ore in a substantially dry condition with hydrochloric acid gas, in combination with the step of leaching the unchloridized roasted ore with a suitable solvent capable of and proportioned for removing a considerable proportion of the zinc oxide, whereby the amount of zinc chloride and water formed by reaction of the zinc oxide with hydrochloric acid will be insufficient to produce a syrupy mass which is difficultly penetrated by the chloridizing gas.

12. The method, in accordance with claim 10, of treating an ore material containing a high content of zinc oxide and another difficultly chloridizable zinc compound comprising the steps of treating the material with an acid solvent to dissolve the major portion of the zinc oxide, thereafter subjecting the residue in a substantially dry condition to the action of hydrochloric acid gas to convert the remainder of the zinc oxide to zinc chloride and subsequently treating the difficultly chloridized portion of the ore with chlorine to chloridize the same.

13. The method of recovering zinc from a complex ore containing the sulfides of iron and zinc comprising the steps of roasting the ore to form zinc and ferric oxides, treating the roasted ore with a solvent for the zinc oxide but leaving sufficient zinc oxide in the roasted material to prevent the formation of a soluble iron salt, and thereafter chloridizing the roasted material under conditions which produce zinc chloride.

14. The process of chloridizing an ore material containing iron sulfide and a high content of a zinc compound comprising the steps of roasting said material under oxidizing conditions to produce ferric oxide, leaching a portion of the zinc content from the roasted material by means of a dilute acid solvent, but leaving sufficient zinc oxide to prevent the ferric oxide from being converted to a soluble salt, thereafter treating the mixture with hydrochloric acid to produce zinc chloride and ultimately recovering the zinc chloride while leaving the iron content as ferric oxide.

15. The process of claim 14 in which the zinc oxide is chloridized by means of hydrochloric acid gas and said reduction in zinc content is such that, with reference to the capability of the residue to absorb the water of reaction, the amount of zinc chloride and water formed will be insufficient to produce a syrupy condition and materially hinder the penetration of the reagent gas into the ore material.

16. The method of treating a metallurgical ore containing iron sulfide and a high content of zinc sulfide comprising the steps of roasting the ore to form zinc and ferric oxides, then leaching from the roasted ore a considerable proportion of the zinc oxide by treatment with an acid solvent while leaving sufficient zinc oxide in the roasted material to prevent the formation of a soluble iron salt of said acid and therafter treating the residue with hydrochloric acid gas to form zinc chloride, the amount of acid solvent being sufficient to reduce the zinc oxide content so that when treated with hydrochloric acid gas, there will not be enough zinc chloride and water present to form a syrupy mass which hinders penetration by the gas.

17. The method of claim 16 in which the chloridized material is heated in the presence of oxygen and to a temperature at which ferric chloride is not stable and chlorine and insoluble ferric oxide are produced, whereby an iron free solution of zinc chloride may be obtained.

18. The method of claim 17 in which the chloridizing of the residual ore metal sulfide by means of nascent chlorine is carried on in the presence of an alkaline earth metal chloride which serves to fix the available sulfate radical as an insoluble sulfate and prevent the formation of zinc sulfate.

19. The method of treating a roasted sulfide ore containing a high content of zinc oxide and a residual ore metal sulfide comprising the steps of leaching the material with an acid capable of converting the zinc oxide to a soluble salt in order to remove a substantial portion thereof, and thereafter chloridizing the residue with chlorine in the presence of a sufficient amount of an alkaline earth metal compound which is capable of reacting with the available sulfate radical produced by oxidation of said sulfide to prevent the formation of zinc sulfate.

THOMAS A. MITCHELL.